(12) United States Patent
Mere et al.

(10) Patent No.: US 9,741,252 B2
(45) Date of Patent: Aug. 22, 2017

(54) FLIGHT MANAGEMENT SYSTEM AND METHOD FOR MONITORING FLIGHT GUIDANCE INSTRUCTIONS

(71) Applicant: Airbus Operations (SAS), Toulouse (FR)

(72) Inventors: Jean-Claude Mere, Verfeil (FR); Mathieu Versini, Launaguet (FR)

(73) Assignee: Airbus Operations (SAS), Toulouse (FR)

( * ) Notice: Subject to any disclaimer, the term of this patent is extended or adjusted under 35 U.S.C. 154(b) by 0 days.

(21) Appl. No.: 14/965,509

(22) Filed: Dec. 10, 2015

(65) Prior Publication Data

US 2016/0171897 A1    Jun. 16, 2016

(30) Foreign Application Priority Data

Dec. 10, 2014   (FR) ...................... 14 62151

(51) Int. Cl.
  *G05D 1/00*     (2006.01)
  *G08G 5/00*     (2006.01)
  *B64C 13/18*    (2006.01)

(52) U.S. Cl.
  CPC .......... *G08G 5/0039* (2013.01); *B64C 13/18* (2013.01); *G05D 1/0077* (2013.01); *G08G 5/0034* (2013.01); *G08G 5/0047* (2013.01)

(58) Field of Classification Search
  CPC .. G08G 5/0039; G08G 5/0034; G08G 5/0047; B64C 13/18; G05D 1/0077
  See application file for complete search history.

(56) References Cited

U.S. PATENT DOCUMENTS 8,660,715 B2 *   2/2014   Nicolas ................ G05D 1/0077
                                                           701/3
9,139,289 B2 *   9/2015   Raynaud .................. G05B 9/03

* cited by examiner

*Primary Examiner* — Todd Melton
(74) *Attorney, Agent, or Firm* — Nixon & Vanderhye P.C.

(57) ABSTRACT

A flight management assembly including two guidance systems, each one provided with a flight management system. The flight management systems are independent and hosted in different computer equipment. Each of the flight management systems being configured to carry out at least a computation of guidance commands for the aircraft. The flight management assembly also includes a monitoring unit hosted in computer equipment different from the computer equipment hosting the flight management systems and configured to monitor at least the guidance commands computed by the two flight management systems to detect and identify a defective flight management system.

17 Claims, 3 Drawing Sheets

FLIGHT MANAGEMENT SYSTEM AND METHOD FOR MONITORING FLIGHT GUIDANCE INSTRUCTIONS

This application claims priority to French patent application 1462151 filed Dec. 10, 2014, the entirety of which is incorporated by reference.

BACKGROUND OF THE INVENTION

The present invention relates to a flight management assembly of an aircraft, in particular of a passenger or cargo transport aircraft, and to a method for monitoring guidance instructions generated by such a flight management assembly.

Although not exclusively, the present invention applies more particularly to an aircraft implementing operations of the RNP AR (Required Navigation Performance with Authorization Required) type. These RNP AR operations are based on area navigation of the RNAV (aRea NAVigation) type and on operations with required performance of the RNP (Required Navigation Performance) type. They have the distinctive feature of necessitating special authorization in order to be able to be used on an aircraft.

It is known that the RNP concept corresponds to area navigation to which is added, (on board the aircraft) monitoring and warning means which make it possible to ensure that the aircraft remains in a corridor, called RNP, around a reference trajectory. Outside of this corridor, potentially there is relief, e.g., a mountain, or other aircraft. The required performance for an RNP type operation is defined by an RNP value which represents the half-width, in nautical miles (NM), of the corridor around the reference trajectory, within which the aircraft must remain for 95% of the time during the operation. A second corridor (around the reference trajectory) having a half-width of twice the RNP value is also defined. The probability of the aircraft going outside of this second corridor must be less than 10−7 (10 to a power of the minus seventh) per hour of flight.

The concept of RNP AR operations is even more restrictive. The RNP AR procedures are, in fact, characterized by:

(i) RNP values: that are less than or equal to 0.3 NM on approach and which can drop down to 0.1 NM; and which are strictly less than 1 NM at the start of and during a go-around, and which can also drop down as far as 0.1 NM;

(ii) a final approach segment which can be curved; and (iii) obstacles (mountains, traffic, etc.) which can be situated at twice the RNP value with respect to the reference trajectory whereas, for the usual RNP operations, an additional margin with respect to obstacles is provided.

Air traffic authorities have defined a target safety level TLS (Target Level of Safety) of 10−7 per hour of flight. In the case of RNP AR operations, as the RNP values can drop down to as low as 0.1 NM and the obstacles can be situated at twice the RNP value from the reference trajectory, this objective is represented by a probability of the aircraft leaving the corridor of half-width D=2·RNP which must not exceed 10−7 per hour of flight.

The present invention applies to a flight management assembly comprising guidance systems, each provided with a flight management system of the FMS (Flight Management System) type.

The items of equipment installed on board an aircraft, and notably the flight management assembly, must make it possible to achieve the target level of safety if the aircraft must implement operations with required navigation performance with authorization required of the RNP AR type.

The objective is to have the capability of flying the RNP AR procedures with RNP values down to 0.1 NM and to do so without restriction (in a normal situation and in the case of a failure) during departure, approach and go-around.

In order that an aircraft may have the capability of flying such RNP AR procedures, it is notably necessary to be able to eliminate an erroneous source of computation of guidance commands (or instructions) from the guidance loop, in order to counter its possible effects on the trajectory of the aircraft.

In order to be able to implement an operation of the RNP 0.1 type, the flight management assembly must make it possible to comply with a severity of the "hazardous" (dangerous) type in the case of loss of or error in the guidance commands. Moreover, it is necessary, in the case of detection of an incorrect computation, that the aircraft can continue to be guided automatically in order to be kept inside the RNP corridor.

With a flight management assembly having two flight management systems, in the case of disagreement between the two flight management systems, the assembly is not capable of identifying the one that is defective, and the aircraft can therefore no longer be guided automatically and is not capable of implementing such RNP operations.

SUMMARY OF THE INVENTION

The present invention relates to a flight management assembly of an aircraft, making it possible to implement RNP operations such as mentioned above, the flight management assembly comprising two guidance systems, each one provided with a flight management system, the flight management systems being independent and hosted in different equipments, each one of the flight management systems being configured to carry out at least a computation of guidance commands for the aircraft, the flight management assembly also comprising at least one monitoring unit configured to carry out monitorings of data generated by the flight management systems.

According to the invention, the monitoring unit is hosted in an equipment different from the equipment hosting the two flight management systems, and the monitoring unit is configured to monitor the guidance commands computed by the two flight management systems in such a way as to be able to detect and identify a defective flight management system.

In addition to guidance commands (or instructions), the monitoring unit is configured to monitor deviations.

Thus, thanks to this architecture, the monitoring unit is capable of identifying a defective flight management system in order to make it possible to guide the aircraft using a non-defective flight management system, which, as described below, makes it possible for the aircraft to have the capability of flying operations of the RNP type, such as mentioned above, and to overcome the aforesaid disadvantage.

Advantageously, the monitoring unit is configured:

(i) to compute the difference between a guidance command computed by one of the flight management systems and a corresponding guidance command computed by the other of the flight management systems, and to compare this difference with a predetermined margin; and (ii) if the difference is greater than the margin, to analyse the variations of extrapolations of the position of the aircraft, deduced from the respective guidance commands, in such a way as to be able to detect an inconsistent guidance command and thus to detect the flight management system having computed that inconsistent guidance command as being defective.

Moreover, advantageously, each of the flight management systems is configured to also carry out at least one of the following computations: a computation of a position of the aircraft; a computation of a trajectory of the aircraft; and a computation of the deviation between the position and the trajectory of the aircraft.

Moreover, advantageously, the monitoring unit is configured to also carry out at least one of the following monitorings: a monitoring of a computation of a position of the aircraft; a monitoring of an extraction of a procedure in order to implement a required navigation performance with authorization required operation from a navigation database and of a loading of the procedure into a flight plan; and a monitoring of a trajectory computation.

Moreover, advantageously, the guidance of the aircraft is carried out according to data provided by one of the two guidance systems, called the active guidance system, and the flight management assembly comprises switching means configured, in the case of detection by the monitoring unit of a defective flight management system and if the active guidance system is the one comprising this defective flight management system, to generate a switching consisting of making the other one of the two guidance systems active.

Moreover, in a particular embodiment, the flight management assembly comprises two monitoring units configured to carry out the same monitorings.

The present invention also relates to a method for monitoring at least one guidance command (or instruction) provided (or generated) by a flight management assembly such as described above.

According to the invention, the monitoring method comprises the following successive steps:

(i) a step of receiving at least one guidance command to be monitored and a current value of at least one parameter illustrating the current state of the aircraft;

(ii) a first step of computing, at least from the guidance command and the current value of the aircraft, a plurality of positions called extrapolated positions of the aircraft, for successive time periods given starting from a current moment of time;

(iii) a second step of computing route deviations called extrapolated route deviations, corresponding to deviations of the extrapolated positions with respect to a reference segment; and (iv) a step of analyzing the extrapolated route deviations, in order to determine if they diverge or converge in order to be able to deduce if the guidance command is correct or not.

Advantageously, the successive steps are used separately for two guidance commands, received from the two flight management systems of the flight management assembly, if the difference between these two guidance commands is greater than a predetermined margin.

Moreover, advantageously, the first step of computation (of extrapolated positions) consists of computing an extrapolated position of the aircraft using the following data:

(i) the values of parameters of the aircraft, previously validated, illustrating the state of the aircraft;

(ii) a roll instruction representing the guidance command to be monitored;

(iii) the current value of at least one atmospheric parameter; and (iv) a performance model of the aircraft.

Moreover, advantageously, the reference segment is one of the following segments: an active segment of a flight plan followed by the aircraft; and an active segment of a trajectory followed by the aircraft.

The present invention also relates to an aircraft, in particular a transport aircraft, which is provided with a flight management assembly such as the one specified above.

SUMMARY OF THE DRAWINGS

The figures illustrate an embodiment of the invention. In these figures, identical references denote similar elements.

DETAILED DESCRIPTION

Figure 1:
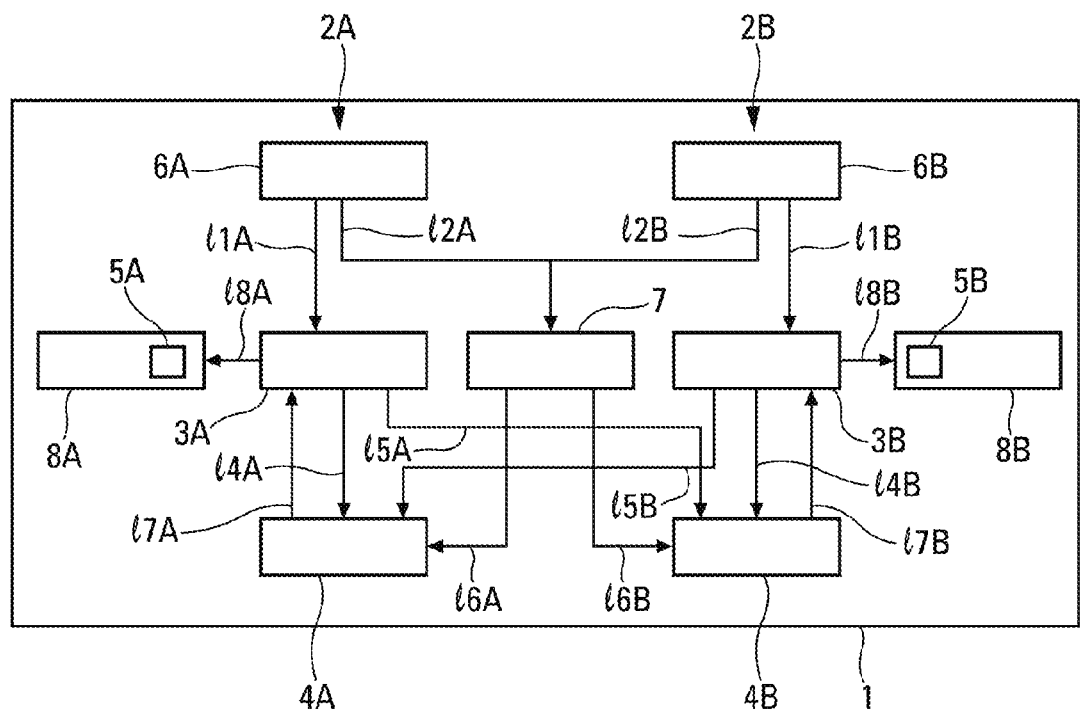
FIG. 1 is a block diagram of a particular embodiment of a flight management assembly of an aircraft.

FIG. 1 is a diagrammatic representation of a flight management assembly 1 of an aircraft, in particular of a transport aircraft, which makes it possible to illustrate the invention.

This flight management assembly 1 which is installed on board an aircraft comprises two guidance systems 2A and 2B, each provided with a flight management system 3A and 3B of the FMS (Flight Management System) type. Both of the flight management systems 3A and 3B are independent and are hosted in different items of computer equipment (items of hardware).

Each of the flight management systems 3A and 3B is configured to carry out computations as described below, and notably computation of guidance commands for the aircraft.

The guidance of the aircraft is carried out according to data (and notably the guidance commands) provided by just one of the two guidance systems 2A and 2B, called the active guidance system.

The flight management assembly 1 also comprises at least one monitoring unit 4A, 4B configured to carry out monitorings of data generated by the flight management systems 3A and 3B.

According to the invention, the monitoring unit 4A, 4B is hosted in an item of computer equipment (hardware) different from the equipments hosting the two flight management systems 3A and 3B. Moreover, according to the invention, the monitoring unit 4A, 4B is configured to carry out a monitoring of the guidance commands (or instructions) computed by the two flight management systems 3A and 3B in such a way as to be able to detect and identify, if necessary, a defective flight management system from among the flight management systems 3A and 3B, as described below.

"Defective flight management system" is understood to mean a flight management system which computes and transmits a guidance command which is erroneous (or incorrect).

In addition to the guidance commands (or instructions), the monitoring unit 4A, 4B is also configured to monitor deviations.

In an embodiment, shown in FIG. 1, the flight management assembly 1 comprises two monitoring units 4A and 4B which are configured to carry out the same monitorings. This makes it possible, in the case of a failure of one of these monitoring units 4A and 4B in RNP operation, nevertheless to be able to detect, if necessary, a defective flight management system 3A or 3B, and therefore ensure the integrity required for this type of RNP operation.

Moreover, the flight management assembly 1 comprises a switching device configured, in the case of detection by the monitoring unit 4A, 4B of a defective flight management system (for example the flight management system 3A) and if the active guidance system is the one comprising this defective flight management system (the guidance system 2A in this example), to generate a switching consisting of making the other one of the two guidance systems 2A and 2B (namely the guidance system 2B in this example) active.

In a particular embodiment, the switching device comprise a button (not shown) which is installed in the cockpit and which allows a crew member to control the switching manually.

Moreover, in a variant embodiment, the controller comprise at least one control unit 5A, 5B which is installed in a guidance computer 8A, 8B and which carries out the switching as a function of a received monitoring status.

The monitoring unit 4A, 4B is thus capable of isolating a defective flight management system in order to allow the crew to carry out an RNP operations, with an acceptable response time. Moreover, as described below, the monitoring unit 4A, 4B carries out monitoring based on a real current state of the aircraft (speed, position, roll, . . . ) instead of on predicted data (flight plan, trajectory).

In order to be able to identify which one of the two flight management systems 3A and 3B is erroneous, the monitoring unit 4A, 4B monitors each computation step used by the latter and ensures that the two flight management systems 3A and 3B use a consistent reference for the following step.

The monitoring unit 4A, 4B is configured:

(i) to compute the difference between a guidance command computed by one of the flight management systems 3A and 3B and a corresponding guidance command computed by the other one of the flight management systems 3A and 3B, and to compare this difference with a predetermined margin; and (ii) if the difference is greater than the margin, in order to carry out a verification of consistency by analyzing the variations of the extrapolations of the position of the aircraft, deduced from the respective guidance commands, in such a way as to be able to detect an inconsistent guidance command (that is to say an erroneous one) and thus to detect the flight management system having computed that inconsistent guidance command as being defective.

The flight management assembly 1 is therefore based on a new architecture having two flight management systems 3A and 3B which implements a monitoring, notably, of the computation of the deviations and of the guidance commands (or instructions). The monitoring of the guidance commands generated by a flight management system 3A, 3B is based on an extrapolation of the position of the aircraft.

Moreover, each of the flight management systems 3A and 3B is configured to carry out also, in addition to the generation of guidance commands in order to slave the position of the aircraft on the trajectory, the following computations: a computation of the position of the aircraft a computation of the trajectory of the aircraft, and a computation of the deviation between the position and the trajectory of the aircraft.

Moreover, each of the monitoring units 4A and 4B is configured to also carry out, in addition to the monitoring of the deviations and of the guidance instructions (or commands), the following monitorings of computations carried out by the flight management systems 3A and 3B:

(i) a monitoring of a computation of a position of the aircraft;

(ii) a monitoring of an extraction of an RNP procedure from a navigation database of the NDB (Navigation Data Base) type, the RNP procedure being stored in the navigation database of the flight management system, and a loading of the procedure into a flight plan; and (iii) a monitoring of a trajectory computation.

These monitorings are described below.

As shown in FIG. 1, each guidance system 2A, 2B comprises a set 6A, 6B if usual sensors for determining (measuring, computing, . . . ) the values of parameters related to the state (position, speed, . . . ) of the aircraft and to its environment (temperature, . . . ) these values are provided via a link 11A, 11B from the set 6A, 6B to the corresponding flight management system 3A, 3B ("corresponding" signifying that which forms part of the same guidance system 2A, 2B).

Each flight management system 3A, 3B computes a position of the aircraft on the basis of values received from the corresponding set 6A, 6B of sensors. The flight management assembly 1 also comprises an auxiliary unit 7 which computes a third position on the basis of values received from the sets 6A and 6B via links 12A and 12B respectively. This auxiliary unit 7 serves as a third source of data for the purpose of a comparison and of a selection in the monitoring unit 4A, 4B. This auxiliary unit 7 solely carries out the computations indicated and does not correspond to a (third) flight management system.

The monitoring unit 4A receives information from the flight management system 3A, from the flight management system 3B and from the auxiliary unit 7, via the links 14A, 15B and 16A respectively, and can provide information to the corresponding flight management system 3A, via a link 17A. The monitoring unit 4A can supply the results of monitorings implemented (and notably the monitoring status) directly to the guidance computer 8A described below.

Similarly, the monitoring unit 4B receives information from the flight management system 3A, from the flight management system 3B and from the auxiliary unit 7, via the links 15A, 14B and 16B respectively, and can provide information to the corresponding flight management system 3B via a link 17B. The monitoring unit 4B can also provide the results of monitorings implemented (and notably the monitoring status) directly to the guidance computer 8N described below.

The monitoring of the position computation is carried out in the monitoring unit 4A, 4B (or in the flight management system 2A, 2B) by comparison and selection of the positions supplied by the two flight management systems 4A, 4B, with the position provided by the auxiliary unit 7.

Moreover, each flight management system 3A, 3B extracts the RNP procedure from its database before the operation and loads it into a flight plan. The two flight plans are sent to the monitoring units 4A and 4B which compares them. The monitoring is therefore carried out by comparison of the two flight plans after loading the procedure. As the loading is carried out before flying the procedure, in the case of disagreement the monitoring units 4A and 4B request another computation from each flight management system 3A and 3B. After several unsuccessful attempts (at least two), the operation is declared impossible and the crew is prompted to consider another approach procedure.

Moreover, each of the flight management systems 3A and 3B computes a trajectory on the basis of the validated flight plan. The auxiliary unit 7 computes the active segment (or a few segments in front of the current position of the aircraft) on the basis of the same validated flight plan. The monitoring can consist:

(i) either of a comparison of the three active segments, respectively received from the flight management systems 3A and 3B and from the auxiliary unit 7 with a selection in the case of disagreement;

(ii) or of a consistency check on the basis of the flight plan validated during the preceding operation. In this case, it is not necessary for the auxiliary unit 7 to compute an active segment. The monitoring unit 4A, 4B computes a check area around the flight plan and verifies if the active segments received from the flight management systems 3A and 3B are contained in this area in order to validate them.

Moreover, each of the flight management systems 3A and 3B computes the guidance commands (or instructions) on the basis of the validated position and of the previously validated active segment and sends them to the monitoring unit 4A, 4B which monitors the variation of the extrapolation of the position of the aircraft, derived from these guidance commands, and invalidates the computation in the case of detection of an anomaly by setting a monitoring status to invalid. As shown in FIG. 1, each of the two guidance systems 2A and 2B of the flight management assembly 1 comprises a guidance computer 8A, 8B of the FG (Flight Guidance) type. One of the guidance computers 8A, 8B, namely the guidance computer of the active guidance system, controls the usual servo-controls of the aircraft's control surfaces in order to guide the aircraft in accordance with the guidance commands.

The logic of selection (as a function of the monitoring status) between the guidance computer 8A and the guidance computer 8B, for controlling the servo-controls and guiding the aircraft, is implemented in these guidance computers 8A and 8B in the usual way via the usual communications means 5A and 5B.

In the case of a difference greater than the aforesaid predetermined margin between the two guidance commands, respectively generated by the flight management systems 3A and 3B, the monitoring of these guidance commands, implemented by the monitoring units 4A and 4B, is based on the analysis of the guidance commands, correlated with the current state of the aircraft, in order to compute extrapolated positions of the aircraft over defined periods of time (for example each second up to ten seconds) and to compare them with a reference segment (of a flight plan or of a trajectory).

Figure 2:
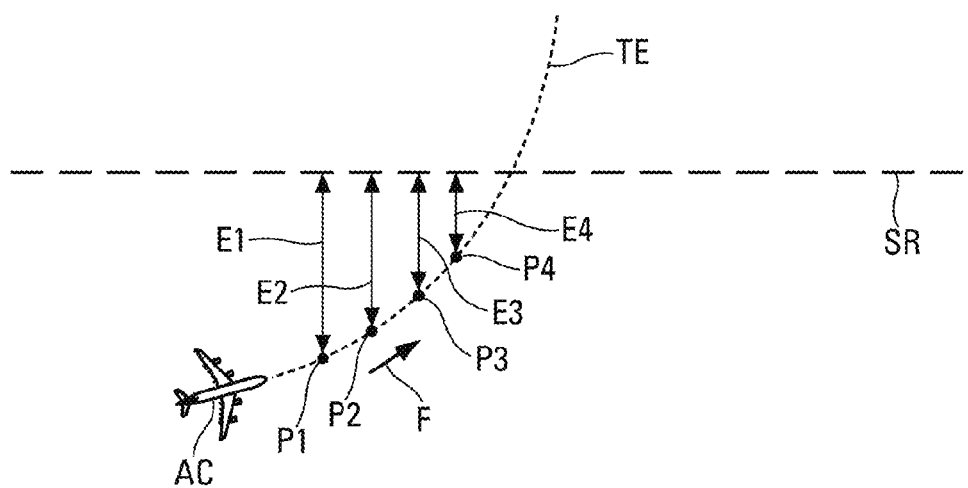
FIG. 2 is a diagram showing an aircraft flying along an extrapolated flight trajectory, upon which route deviations with respect to a reference segment have been indicated.

In order to do this, each of the monitoring units 4A and 4B implements the following successive steps:

(i) a computing step ET1 for computing, from the guidance command to be monitored, a plurality of positions P1, P2, P3, P4, called extrapolated positions of the aircraft AC, as shown in FIG. 2, for periods of time given starting from the present moment;

(ii) a step ET2 of computing route deviations E1, E2, E3, E4, called extrapolated deviations, respectively corresponding to deviations of the extrapolated positions P1, P2, P3, P4 of the aircraft AC, which form an extrapolated trajectory TE (the direction of flight of which is indicated by an arrow F in FIG. 2), with respect to a reference segment SR (FIG. 2); and (iii) a step ET3 of analysis of the extrapolated route deviations E1 to E4, in order to determine if they diverge or converge (with respect to the reference segment SR), in order to be able to determine if the guidance command is correct or not, the principle of the flight management system 3A, 3B being to compute a guidance command intended to make the aircraft converge towards the reference segment SR.

In this way there is obtained a method (used by the flight management assembly 1) for monitoring guidance commands at the output of a flight management system 3A, 3B, which is fast, simple, inexpensive and efficient.

The steps ET1 to ET3 of the monitoring method are described hereafter.

Step ET1 consists of computing an extrapolated position of the aircraft, for example after 1, 2, . . . 10 seconds, using the following data:

(i) the current values of parameters (position, speed, . . . ) of the aircraft representing the current state of the aircraft. These values must be validated by position monitoring (comparison of data from three sources to check if the source used is correct or not);

(ii) a roll instruction (or roll command instruction) representing the guidance command whose validity is to be evaluated;

(iii) the current values of atmospheric parameters (wind, altitude, temperature, . . . ); and (iv) a usual performance model of the aircraft.

In this step ET1, the monitoring, implemented by the monitoring unit 4A, 4B, considers that the aircraft is flying for a predefined period of time with a roll angle equal to the roll instruction provided by the flight management system in question.

Step ET2 consists of computing the route deviations E1 to E4 of the extrapolated positions with respect to the active segment validated by the monitoring of the trajectory computation.

Moreover, step ET3 carries out an analysis of the extrapolated route deviations. The evolution of the extrapolated route deviations is analyzed in order to determine if they diverge or converge in order to be able to detect and identify a defective flight management system. This corresponds to the analysis of a graph of the route deviation variation with respect to time, for different times of anticipation.

Figure 3:
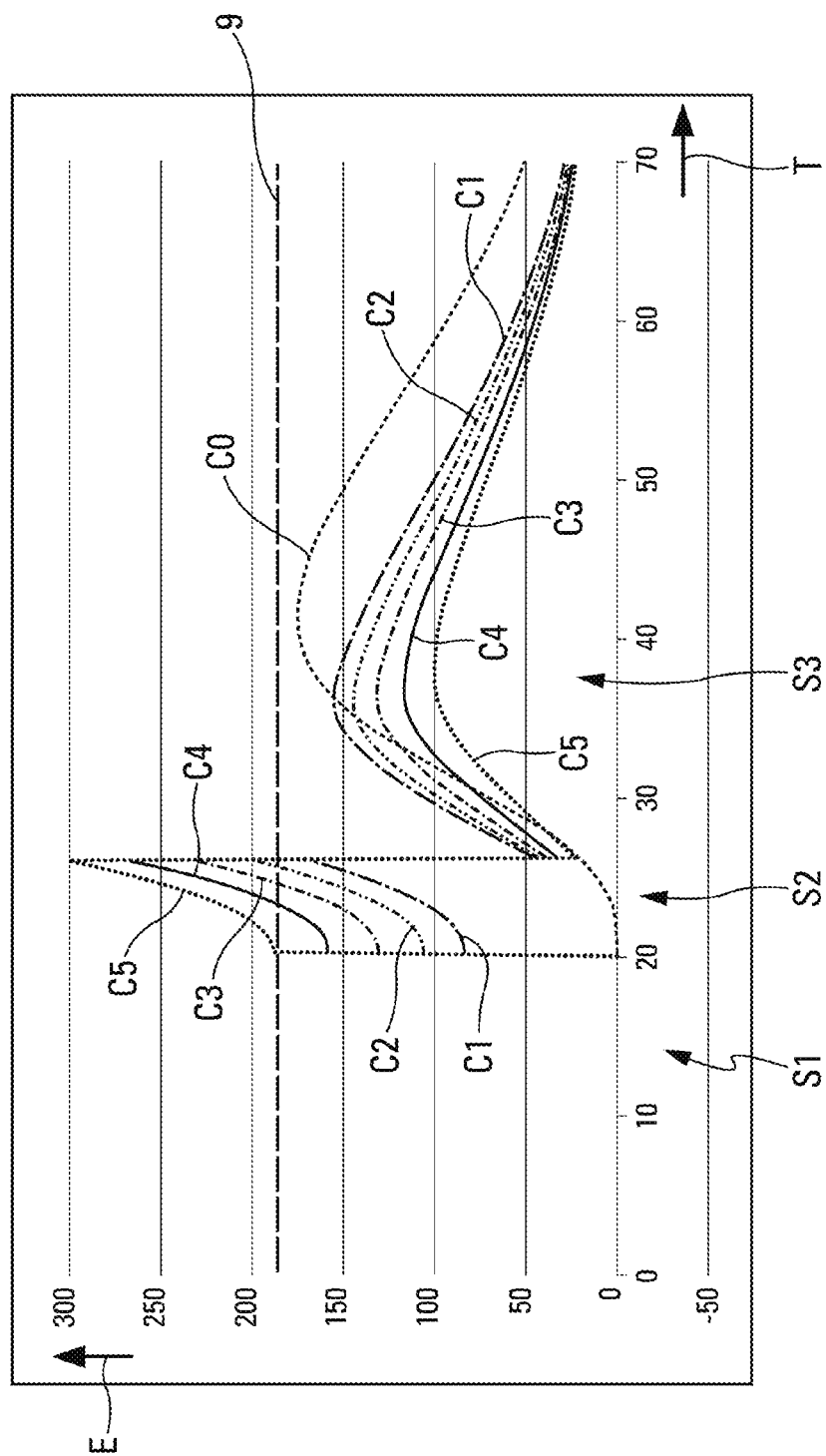
FIG. 3 is a graph illustrating the variation of route deviations of an aircraft, as well as the variations of route deviations for different anticipation times, as a function of time, in the case of an incorrect roll command.

This analysis is indicated in FIG. 3. In this FIG. 3:

(i) the horizontal axis represents time T in seconds and the vertical axis represents the route deviation value E in meters (with respect to the reference segment) with an indication of a limit 9 at 185.2 meters (which represents a limit of an RNP 0.1 NM corridor); and (ii) The curve C0 in dashed line represents the variation of the route deviation of the aircraft as a function of time, in the case where an incorrect roll instruction is computed by a flight management system between 20 seconds and 26 seconds.

Moreover, the curves C1 to C5 represent the route deviation evolutions for five different anticipation time periods (or times). In these anticipations, the positions which are expected in the period corresponding to the anticipation time period with the roll command in question, and therefore the route deviations corresponding to these positions, are considered. In the example of FIG. 3, there is provided: for C1: an anticipation of 8 seconds; for C2: an anticipation of 9 seconds; for C3: an anticipation of 10 seconds; for C4: an anticipation of 11 seconds; and for C5: an anticipation of 12 seconds.

Three different situations S1, S2 and S3 can be observed in this FIG. 3: a first situation S1 between 0 and 20 seconds; a second situation S2 between 20 seconds and 26 seconds; and a third situation S3 after 26 seconds.

In the first situation S1 (between 0 and 20 seconds), the aircraft is exactly on the reference section in question (namely, a straight segment). The route deviation and the route angle error are zero. The computed roll instruction is therefore zero. An anticipation of the position of the aircraft with a zero roll instructions remains on the trajectory. Thus, the corresponding route deviation is also zero for the curves C1 to C5. All of the curves C0 to C5 are therefore identical.

In the second situation S2 (between 20 seconds and 26 seconds), the flight management system in question generates, incorrectly, a roll instruction equal to 15°, whereas the reference segment is still a straight segment. Because of this incorrect roll instruction, the aircraft gently begins to diverge from the reference segment. The anticipation of the position of the aircraft is faster. Considering a movement of the aircraft using a constant roll of 15°, it is expected that the aircraft has a route deviation of 185.2 meters in 12 seconds (curve C5 at 20 seconds). The anticipations with an shorter anticipation time result in route deviation values between 80 and 160 meters (curves C1 to C4). Over the course of time, the real route deviation and angle error values increase, resulting in the anticipated route deviation also increasing. As the roll instruction is incorrect, the aircraft will not converge towards the reference segment. Also, 12 seconds of anticipation (curve C5) provide bigger route deviation values than 8 seconds of anticipation (curve C1).

After several seconds of monitoring, the monitoring unit 4A, 4B detects that the route deviations are divergent, and the aircraft is switched onto the non-defective flight management system which computes a correct roll instruction.

In the third situation S3 (starting from 26 seconds), the flight management system computes a correct roll instructions with respect to the current route deviation and to the current route angle error. The aircraft gently begins to return towards the reference segment, but as the roll has already increased between 20 seconds and 26 seconds, approximately 15 seconds are required before the route deviation begins to lower.

As the (correct) roll supplied by the flight management system returns the aircraft onto the reference segment, the anticipation of the roll instruction over a long period (12 seconds) provides a lower route deviation than the anticipation over a short period (8 seconds). This signifies that the roll instruction is consistent and that the aircraft will converge. This can be seen on the graph in FIG. 3 by the inversion of the curves C1 to C5. The curve C1 for example is the lowest when the roll instruction of the flight management system is incorrect and it becomes the highest when the roll instruction of the flight management system is correct.

With a suitable choice of anticipation time values and taking account of the fact that, in the case of absence of an incorrect roll instruction, the roll instruction is computed to always return the aircraft onto the trajectory in question, the evolution of the extrapolated route deviation values provides good information for determining if the roll instruction is correct or not, or at least if the aircraft is diverging or converging with respect to the trajectory in question.

Moreover, the monitoring implemented by the monitoring unit 4A, 4B notably is configured to avoid interference detections, in particular in the case of a side wind gust. It is known that in the case of a side wind gust, the route deviation induced by the lateral displacement of the aircraft and the roll induced by the gust of side wind can result in an anticipated route deviation reaching high values.

Figure 4:
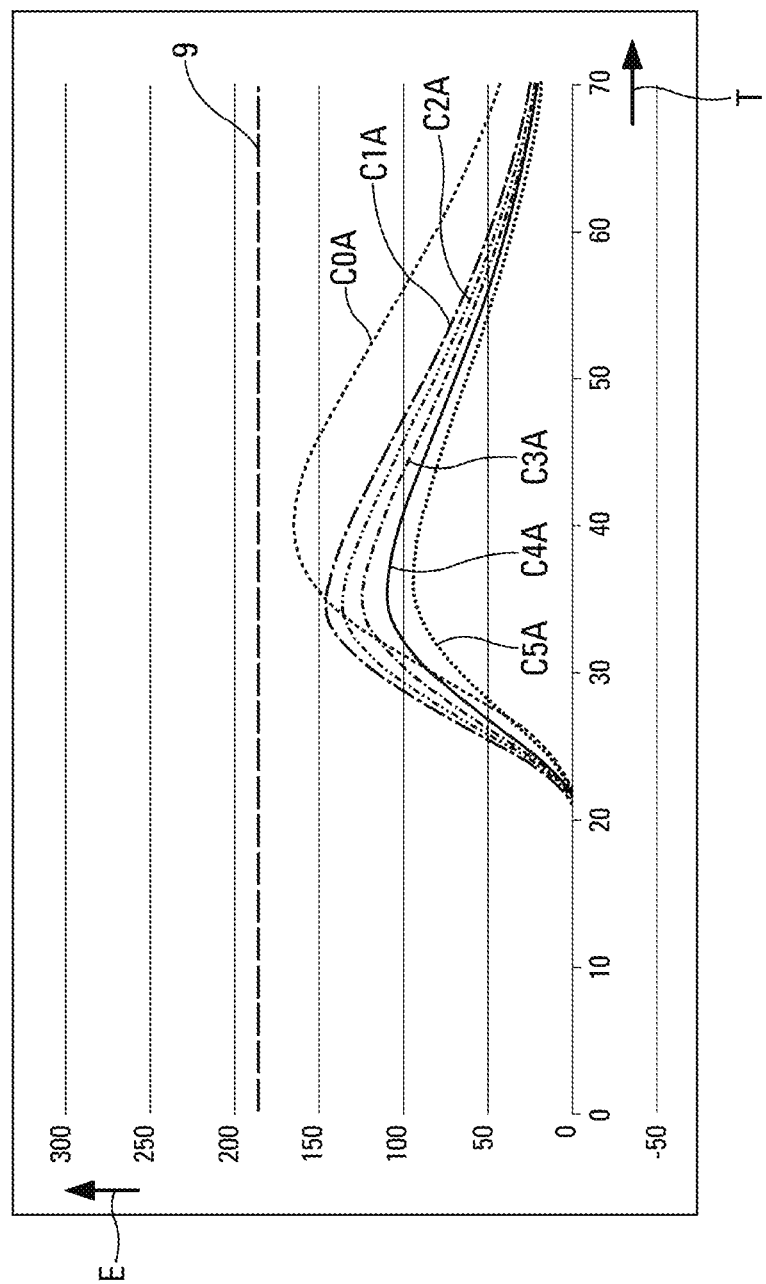
FIG. 4 is a graph illustrating the variation of route deviations of an aircraft, as well as the variations of route deviations for different anticipation times, as a function of time, in the case of a side wind gust and of a correct roll command.

By way of illustration, FIG. 4 shows the same type of graph as does FIG. 3 (with the curves C1A to C5A corresponding to the same anticipation times as the curves C1 to C5 of FIG. 3, C0A corresponding to C0), in the case where the roll instruction is computed correctly, but a side wind gust or an abnormal guidance causes the roll of the aircraft to increase by 5° per second, between 20 seconds and 23 seconds.

The main difference in FIG. 4 with respect to FIG. 3 is that the curve C1A (8 seconds of anticipation) shows route deviation values higher than the other curves. As the roll instruction is correct, it is expected that the aircraft should converge onto the reference segment, using this correct roll instruction. Consequently, even if the anticipated route deviation values increase by about 185 m, no warning is given.

The monitoring takes account of the margins and of the filters making it possible to avoid false detections (for example in the case of side wind gusts).

The aforesaid monitoring (steps ET1 to ET3) are added to the direct comparison of the guidance commands received from the two flight management systems 3A and 3B, in order, in the case of divergence, to discriminate the failed guidance system.

The flight management assembly 1, such as described above, therefore has an architecture based on two flight management systems 3A and 3B and on monitorings (implemented notably by the monitoring units 4A and 4B), including a monitoring of the guidance commands, in order to be able to implement operations of the RNP 0.1 type.

This architecture makes it possible:

(i) to avoid having to install a third flight management system (to serve as a third selection source), which would be expensive and complicated;

(ii) to obtain a fast response time; and (iii) to identify if necessary a defective flight management system (in the case of erroneous computation of guidance commands) making it possible to invalidate the defective flight management system and to continue the operation on the remaining flight management system that has not failed and, if possible, to resynchronize the defective flight management system with the flight management system that is not defective.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A flight management assembly of an aircraft comprising:
   guidance systems each provided with a flight management system, the flight management systems being independent of each other and hosted in different computer equipment, each of the flight management systems being configured to compute guidance commands for the aircraft,
   at least one monitoring unit configured to monitor data generated by the flight management systems, wherein the monitoring unit is hosted in a computer equipment different from the computer equipment hosting the flight management systems, and in that the at least one monitoring unit is configured to monitor the guidance commands computed by flight management systems to detect and identify a defective flight management system,
   wherein the at least one monitoring unit is configured:
   to compute a difference between a first guidance command computed by one of the flight management systems and a corresponding second guidance command computed by another one of the flight management systems;
   if the difference is greater than the certain margin, to analyze variations between the first guidance command and the second guidance command by comparing a first extrapolated position of the aircraft based on the first guidance command with a corresponding second extrapolated position of the aircraft based on the second guidance command;
   to detect whether one of the first and second guidance commands is inconsistent based on the comparison the first and second extrapolated positions, and
   to determine which of the flight management systems computed an inconsistent guidance command based on the detection of an inconsistent flight guidance command and designate as being a defective flight management system the flight management system that generated the inconsistent flight guidance command.

2. The flight management assembly according to claim 1, wherein each of the flight management systems is further configured to:
   compute a position of the aircraft;
   compute a trajectory of the aircraft; and
   compute a deviation between the position and the trajectory of the aircraft.

3. The flight management assembly according to claim 1, wherein the monitoring unit is further configured to:
   monitor computation of a position of the aircraft;
   monitor extraction of a procedure in order to implement a required navigation performance with authorization required operation from a navigation database and loading of the procedure into a flight plan; and
   monitor trajectory computation.

4. The flight management assembly according to claim 1, further comprising a switch configured, in the case of detection by the monitoring unit of a defective flight management system and if the active guidance system is the one comprising this defective flight management system, to generate a switching consisting of making another one of the guidance systems active, wherein the guidance of the aircraft is carried out according to data provided by one of the guidance systems.

5. The flight management assembly according to claim 1, further comprising another monitoring unit wherein said another monitoring unit is configured to carry out the same monitoring of the data generated by the flight management systems as the monitoring unit.

6. The flight management assembly of the aircraft according to claim 1, wherein the reference segment is a segment of a flight plan or a trajectory followed by the aircraft.

7. A method for monitoring at least one guidance command provided by a flight management system comprising:
   receiving at least one guidance command to be monitored and a current value of at least one parameter illustrating a current state of the aircraft;
   computing a plurality of extrapolated positions of the aircraft using the guidance command and the current value of the aircraft, where each of the extrapolated positions corresponds to one of a successive series of time periods;
   computing extrapolated route deviations, each corresponding to a deviation of one of the extrapolated positions with respect to a reference flight path segment; and
   analyzing the extrapolated route deviations and determining that the at least one guidance command is correct if the deviations converge and is incorrect if the deviations diverge.

8. The method according to claim 7, wherein the computation of the extrapolated positions includes computing an extrapolated position of the aircraft using the following data:
   values of parameters of the aircraft, the values being previously validated and illustrating the state of the aircraft;
   a roll instruction representing the guidance command to be monitored;
   a current value of at least one atmospheric parameter; and
   a performance model of the aircraft.

9. The method according to claim 7, wherein the reference segment is one of the following segments:
   an active segment of a flight plan followed by the aircraft; and
   an active segment of a trajectory followed by the aircraft.

10. The method according to claim 7, wherein the steps are performed separately for two guidance commands, received from two flight management systems of the flight management assembly, if a difference between these two guidance commands is greater than a predetermined margin.

11. A flight management assembly for use in an aircraft comprising:
    redundant guidance systems each provided with a flight management system, wherein each guidance system is hosted on a computer different from a computer hosting the other guidance systems, and the flight management system in each of the guidance systems is configured to generate flight guidance commands for the aircraft while in flight;
    a monitoring unit hosted on another computer and configured to monitor the flight guidance commands generated by each of the flight management systems, wherein the monitoring unit:
    computes a difference between a first flight guidance commands computed by one of the flight management systems and a corresponding second flight guidance command computed by another one of the flight management systems;
    determines if the difference exceeds a certain margin;
    if the difference exceeds the certain margin, extrapolates a position of the aircraft based on the first and second flight guidance commands and, based on the extrapolated position, determines which of the first and second flight guidance commands is inconsistent, and determines that an error exists in the flight management system having computed the inconsistent guidance command.

12. The flight management assembly of claim 11, wherein the determination of the one of the flight commands as being inconsistent includes:
for the extrapolated position, determining a deviation between a flight plan for the aircraft and the extrapolated position, and
determining the inconsistent flight guidance command based on the deviation from the flight plan.

13. A flight management assembly of an aircraft, comprising
plural guidance systems,
plural flight management systems, each of the flight management systems being coupled to a guidance system and being configured to generate plural guidance commands for the aircraft,
a monitoring system configured to:
receive guidance commands generated from at least two of the flight management systems;
calculate a difference between a first guidance command generated by one of the flight management systems and a corresponding second guidance command generated by another one of the flight management systems;
if the difference is greater than a predetermined margin, calculate a first and a second set of extrapolated positions of the aircraft based on the first and second guidance commands respectively, and analyze a deviation of each of the first and second sets of extrapolated positions with respect to a reference segment to determine whether one of the first and second guidance commands is defective and/or which flight management system has computed a defective guidance command.

14. The flight management assembly of the aircraft according to claim 13, wherein the first and second set of extrapolated positions of the aircraft are calculated based on a current state of the aircraft and a performance model of the aircraft.

15. The flight management assembly of the aircraft according to claim 13, wherein the reference segment is a segment of a flight plan or a trajectory followed by the aircraft.

16. The flight management assembly of the aircraft according to claim 13, wherein the first and second guidance commands are a roll instruction.

17. The flight management assembly of the aircraft according to claim 13, further comprising:
a switch configured to, if it is determined that a flight management system has computed a defective guidance command and the flight management system is coupled to an active guidance system, switch from the active guidance system to another guidance system.

* * * * *